Jan. 14, 1964  W. M. WALDBAUER  3,117,728
LIGHTING SYSTEM
Filed Sept. 12, 1960  3 Sheets-Sheet 1
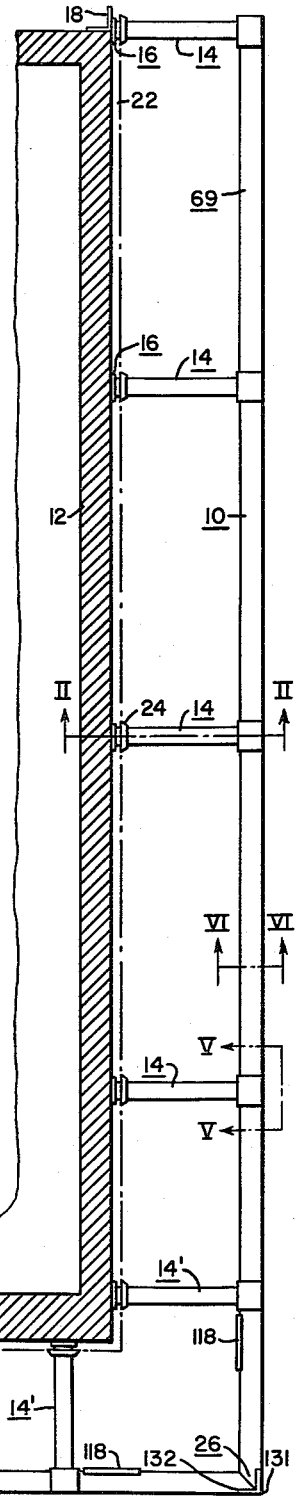
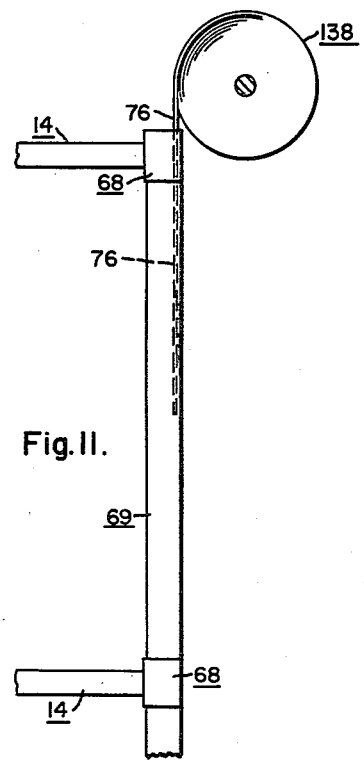
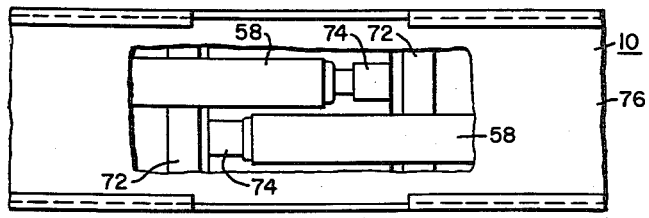
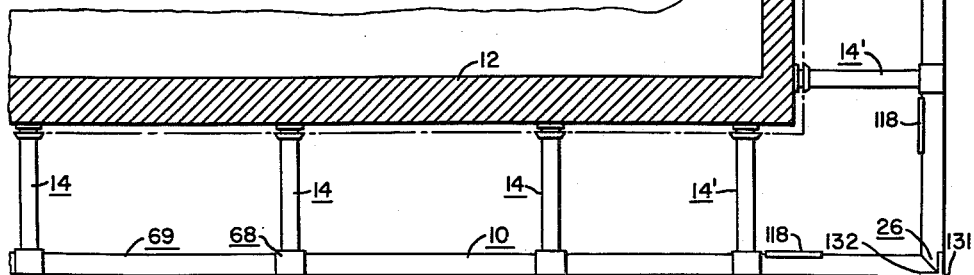

Jan. 14, 1964 W. M. WALDBAUER 3,117,728
LIGHTING SYSTEM
Filed Sept. 12, 1960 3 Sheets-Sheet 2
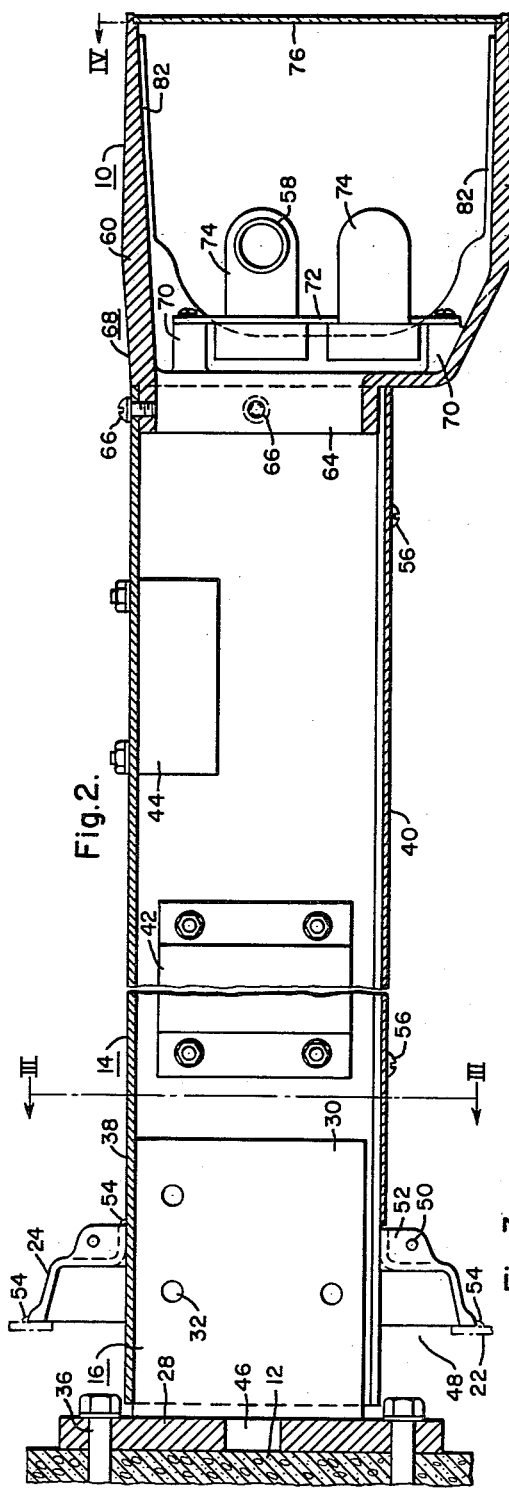
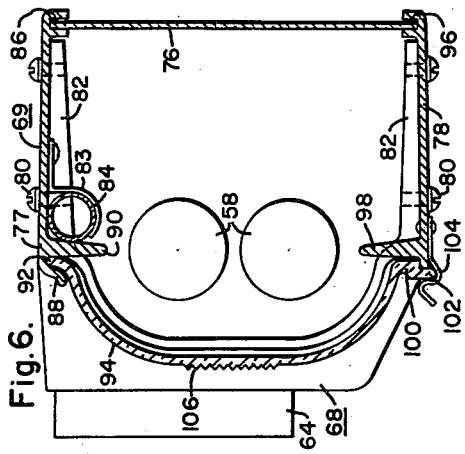
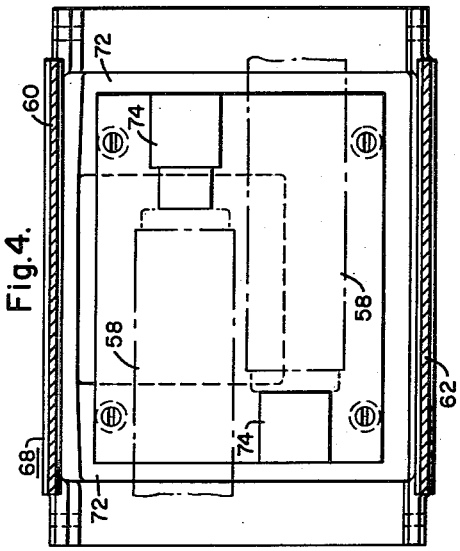
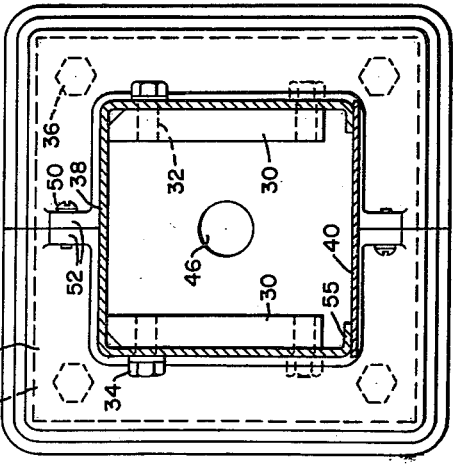

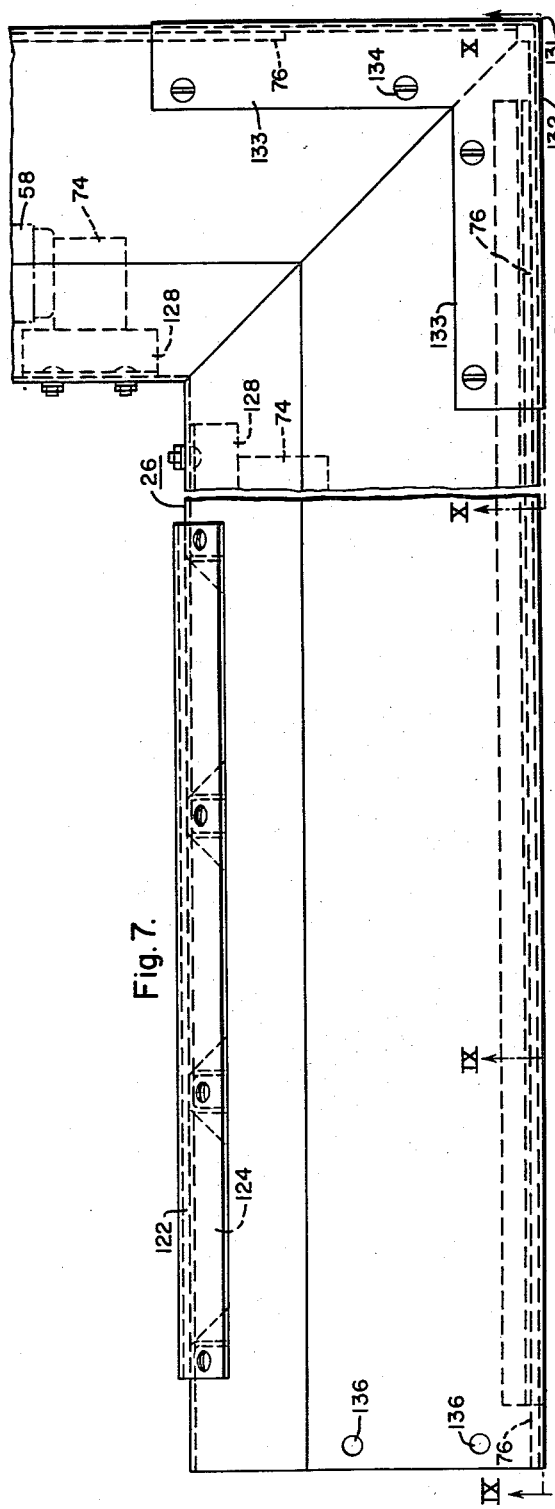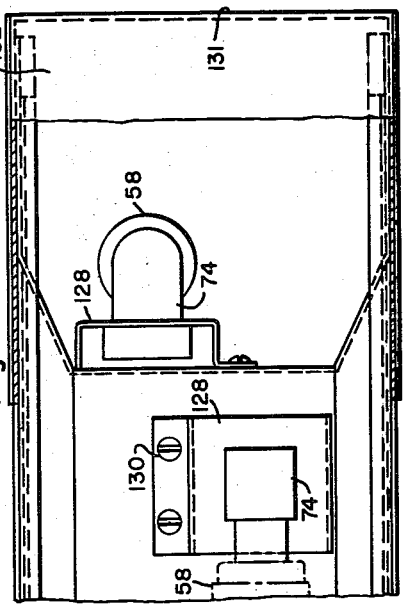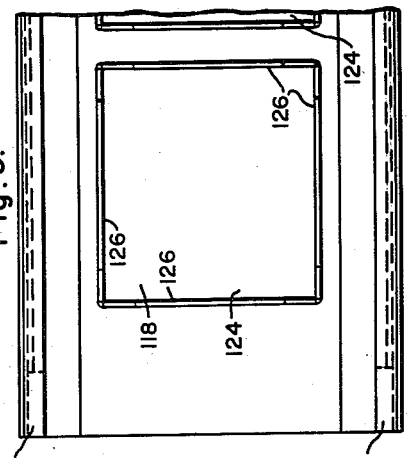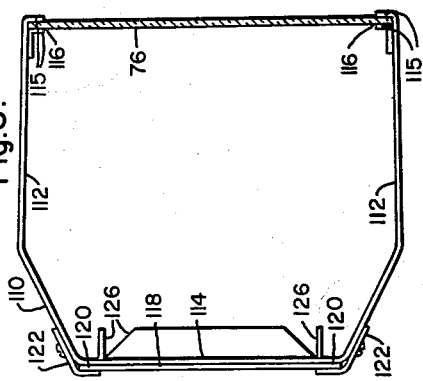

United States Patent Office 3,117,728
Patented Jan. 14, 1964

3,117,728
LIGHTING SYSTEM
Walter M. Waldbauer, North Olmsted, Ohio, assignor to Westinghouse Electric Corporation, East Pittsburgh, Pa., a corporation of Pennsylvania
Filed Sept. 12, 1960, Ser. No. 55,492
8 Claims. (Cl. 240—9)

The present invention relates generally to a novel luminaire structure and lighting system, and more particularly to a continuous band lighting system wherein both the building to which the luminaire structure is attached and the adjacent area are lighted simultaneously at high illumination levels and shadows cast upon the building by the luminaire structure are eliminated.

Band lighting systems are generally of two different kinds, the cornice type and the valance type. The cornice type comprises lighting fixtures arranged in continuous rows behind cornices which are added to the roof overhang of a building. The valance type consists of a band lighting system having a series of support arm assemblies suitably spaced and secured to a building wall and connected by a lighting band around the outside of the building. The present invention relates to a band lighting system of the valance type. However, previous valance band lighting systems have failed to provide a means to illuminate adequately the building structure as well as to illuminate the area in front of and adjacent to the building and have also failed to provide a continuous band so as to be attractive to the viewer by eliminating intermittent dark areas therein.

Accordingly, an object of this invention is to provide a band lighting system having bidirectional flood lighting so as to illuminate the adjacent area as well as the building to which it is attached.

Another object of this invention is to provide a light system presenting a continuous band of light unbroken by dark areas therein.

A further object of the invention is to avoid intermittent dark spots in the band at the ends of the lamps by providing for an overlapping socket arrangement.

A still further object of the invention is to provide a continuous band lighting system that not only eliminates dark spots but also light leaks.

Another object of the invention is to provide a band lighting system having a light-transmitting rear cover, the cover adapted to have prismatic sections extruded therein if desired, to provide an even distribution of illumination upon a building surface.

Still another object of the invention is to provide a band lighting system having support arms that are electrically wired together through the front of the band portion and that also house the ballast and terminal block assemblies for the fluorescent lamps of the system.

A further object of the invention is to provide for mounting brackets that may be bolted directly to the building wall according to a prearranged spacing plan so as to hold the supporting arms in the correct position.

A still further object of the invention is to provide trim boxes which are mounted around the support arm and are adapted to rest upon a building finish, such as porcelain enamel, so as to easily and conveniently provide a sealing between the finish and the support arm assemblies.

Another important object of this invention is to provide a uniquely different corner section for a band lighting system so that light transmitting portions are provided therein to eliminate shadows that may be cast upon a building wall by the support arms.

Still another object of the invention is to provide a corner section which has provision for accommodating the expansion and contraction of a continuous front plastic band as expediently as possible.

These and other objects, features, and advantages of the invention will become more apparent upon consideration of the following detailed description of a valance type band lighting system incorporating various components constructed in accordance with the principles of the invention when taken in connection with the following drawings, in which:

FIGURE 1 is a partial top plan view of a band lighting system according to the present invention secured to a portion of a building;

FIG. 2 is a longitudinal sectional view of the supporting arm and band assembly of the invention taken along the reference line II—II of FIG. 1;

FIG. 3 is a cross-sectional view of the assembly of FIG. 2 taken along the reference line III—III thereof;

FIG. 4 is a cross-sectional view of the assembly of FIG. 2 taken along the reference line IV—IV thereof;

FIG. 5 is a partial, front elevational view of the band lighting system of the invention taken along the reference line V—V of FIG. 1 with a portion of the front panel broken away so as to more clearly show the staggered or overlapping relationship of the fluorescent lamps of the invention;

FIG. 6 is a cross-sectional view of the lighting band of the invention taken along the reference line VI—VI of FIG. 1;

FIG. 7 is a partial top plan view of a corner section of the band lighting system of the invention;

FIG. 8 is an end view of the corner section structure, with portions removed, taken from the left end of FIG. 9;

FIG. 9 is a partial elevational view of the inside of the corner section of FIG. 7 taken along the reference line IX—IX thereof only with the front panel removed;

FIG. 10 is a view of the corner section of FIG. 7, with certain portions broken away, taken along the reference line X—X thereof; and FIG. 11 is a top plan view of a portion of the band lighting system shown in FIG. 1 illustrating how the front continuous panel is inserted into the band from a spool.

In accordance with the principles of the present invention there has thus been invented a band lighting system which is bidirectional in character and which presents a front light-transmitting band which is unbroken by dark areas except at its ends and corners. The dark areas have been eliminated by the use of a continuous light-transmitting material along each face of the band and by the use of an overlapping lamp arrangement. Diffusing means is incorporated within the housing of the system for providing an even distribution of light despite the fact that the lamps are mounted at different levels. The electrical components for operating the lamps of the system are contained within the unit itself except for the power supply. The corner assembly of the band lighting system is light-transmitting only on the front thereof with the exception of aperture means on its rear portion sufficient to eliminate shadows adjacent a corner of a wall to which the system is attached.

Referring more particularly to the drawings, the illustrative embodiment of this invention as shown in FIG. 1 comprises a luminous or otherwise light-transmitting band assembly 10 which is supported at a spaced distance from an upright structure, such as the walls 12 of a building, by means of cantilever supporting arm assemblies 14 and 14'. These arm assemblies are in turn secured to each building wall 12 by means of mounting brackets 16. The details of the structure of all of these elements are described later.

Because the band assembly 10 contains lamps of standard lengths the end of that assembly possibly will not exactly coincide with the end of a wall 12 of the building. As a result, a right-angled mounting bracket 18 may be necessary to compensate for the difference and provide a means to secure the end mounting bracket 16' thereto. The outer surface of most buildings likely to employ band assembly 10 normally includes a porcelain enamel panel or other similar type surface finish 22 so that a trim box 24 is necessary to neatly seal each supporting arm assembly 14 with respect to the finish 22 involved. FIG. 1 illustrates a corner section 26, which will also be described in more detail later, which serves to join adjacent ends of each band assembly 10 when they are secured to adjoining walls 12.

The cantilever supporting arm assembly 14, as clearly illustrated in FIGS. 2 and 3, is of a generally rectangular shape and is secured to the building wall 12 by means of the mounting bracket 16. The mounting bracket 16 comprises a flat base portion 28 adapted to rest against the face of the wall 12. Extending directly outwardly from the base 28 are a pair of rectangularly shaped arms 30 having apertures 32 therein to receive securing bolts 34. The mounting bracket 16 is secured to the wall 12 in this example by means of through bolts 36 which are mounted in each of the four corners of the base plate 28.

The supporting arm assembly 14 comprises a substantially inverted U-shaped chanel 38 which together with the bottom closure cover member 40 comprises the tubular cantilever arm of the assembly 14. Since the lowermost arm assemblies 14' are identical in structure with the other arm assemblies 14, only the latter will be described here. The arm assembly 14 is provided with the detachable cover 40 so that ready access can be had to the ballast 42 and the terminal block 44 that are contained in and are secured to the arm assembly 14. The ballast 42 and the terminal block 44 may be any of the more commonly known elements well known to the art as necessary to energize and to ballast fluorescent lamps. Electric conductors (not shown) for connecting the fluorescent lamps of the band assembly 10 to a power source may be introduced into the supporting arm through the aperture 46 in the mounting bracket 16. The arm assembly 14 is slipped over the outwardly extending arms 30 of the mounting bracket 16 and is secured thereto by means of apertures that are in registration with the apertures 32 whereby the securing bolts 34 are engaged therewith.

A trim box 24 is preferably made in two identical half sections which are U-shaped in character and are adapted to have their open ends meet with one another so as to form an enclosure around the arm assembly 14 and seal it to the porcelain enamel facing 22 so as to close the opening 48 between the porcelain enamel panels 22 and the arm assembly 14. The two sections of the trim box 24 are secured together by means of screws 50 engaging bossed portions 52. Calking 54 is generally applied around the outer edge of the trim box 24 so as to seal the portions together. The calking 54 can be of the type generally employed in sealing joints of the porcelain enamel panels themselves.

Returning again to the bottom cover 40 of the supporting arm assembly 14, it can be seen from FIG. 2 that this cover only encloses that length of the arm assembly 14 up to the front of the trim box 24 so as to remain steadily removable from the U-shaped top member 38 thereof. The cover in this example is secured to the return portion 55 of the U-shaped member 38 with screws 56 which may be readily removed by means of a screwdriver or the like. Thus, it can be seen that the arm assembly 14 can serve as a wireway for connecting the electrical components necessary to operate the fluorescent lamps 58 employed to illuminate the band assembly 10.

Extending outwardly from the arm assembly 14 is a top projection 60 and a bottom projection 62 of a connector 68 serving in this example to joint horizontal housing sections 69 of the band assembly 10. Also attached to the connector 68 by means of bosses 70 are support plates 72 for securing the lampholders 74 to the band assembly 10. The projections 60 and 62 are connected by a sleeve or collar 64 at the rear thereof which in turn fits into the free end of the arm assembly 14 to provide a passageway for electrical connectors from the arm assembly to the lampholders 74. The collar 64 is secured to the arm assembly 14 by means of screws 66 engaging registered apertures in both the arm assembly 14 and the collar 64. It is to be noted, however, that the top projection 60 and the lower projection 62 are not connected except at their very rear portions by the collar 64. This is in order to allow the fluorescent lamps 58 to extend continuously through the band assembly 10 without interference.

The generally C-shaped connector 68 is preferably made of a lightweight metal such as aluminum or the like so as to minimize the weight at the end of the cantilever arm assemblies 14. The lampholder support plate 72, as viewed in both FIGS. 2 and 4, secures the lampholders 74 in a staggered relationship in the vertical so that the ends of adjacent fluorescent lamps 58 can overlap one another. The reason for this overlapping is that otherwise the fluorescent lamps 58, if abutted end to end, would produce a dark area where the abutting lampholders 74 would meet. Also at the very end of each fluorescent lamp 58, where the filament is normally located, there is presented a dark area actually within the tube of the lamp itself. Thus, the overlapping of adjacent fluorescent lamps 58 must be sufficient to cover the lampholders and the dark ends of the fluorescent lamps 58. As a result the fluorescent lamps 58 in the present invention are staggered and are overlapped so that the illumination from the lower fluorescent lamp end will cover the dark area of the upper fluorescent lamp 58 and its lampholder and, conversely, the upper fluorescent lamp end will cover the dark area that would normally be caused by the lower lampholder 74 and the extreme end of the lower fluorescent lamp 58. This relationship is even more clearly shown in FIG. 5 wherein a portion of the front plastic panel 76 is broken away so as to show the overlapping condition of the upper and lower fluorescent lamps 58 where they are secured to the support plates 72. Thus, by this overlapping or staggered arrangement there has been avoided one of the most dominant defects in previous band lighting assemblies, viz. the inability to provide a continuous lighting band without dark areas caused by the abutting ends of adjacent fluorescent lamps. In connection with this continuous lighting band there will be described later the effects of the continuous panel 76 and also elimination of other dark areas and light leaks to enhance even more the continuous band effect of the present invention.

In order to form the tubular housing or horizontal section 69, as seen best in FIG. 6, for the portion of the band assembly 10 between adjacent arm assemblies 14 there is extended therebetween a top extrusion 77 and a bottom extrusion 78. Both of the extrusions 77 and 78 are preferably made of some lightweight metallic material such as aluminum in order to reduce the weight at the end of the cantilever supporting arm assemblies 14. The top extrusion 77 and the bottom extrusion 78 are attached to the connector 68 by means of bolts 80 extending therethrough and engaging a lip portion 82 extending from the projections 60 and 62 of the connector 68. Besides their attachment to the connector 68 the top extrusion 77 and the bottom extrusion 78 are in no way rigidly connected together except at the corner section 26. The horizontal section 69 forms a wireway in itself. However, if desired there can be attached to the upper extrusion 72 by means of a conventional bracket 83 a tubular wireway 84 through which the group of electrical components 42, 44 and 74 of each arm assembly 14 can be electrically connected to the group of electrical components in the next arm assembly 14. Of course, the wireway 84 could also be formed integrally with the top extrusion 77 if desired. It has been found that in operation it is only necessary to provide the electrical components in every other assembly arm rather than in every one of the arm assemblies 14.

Again referring to the top extrusion 77, at the front end thereof there is a double flanged downwardly extending portion providing a guide slot 86 for the top edge portion of the front plastic or otherwise light-transmitting panel 76. This slot 86 is made wide enough so that the panel 76 can be free to slide therein. At the back of the top extrusion 77 is a downwardly extending lip 88 and slightly inwardly thereof a downwardly protruding tongue 90. The lip 88 and the tongue 90 also form a slot 92 to receive the rear light-transmitting panel or enclosure 94, which is also preferably made of plastic but which can, like the front panel 76, be made of any other light-transmitting material such as glass or the like. The bottom extrusion 78 has a pair of upwardly extending portions at the front end thereof defining a guide slot 96 which is also made of a size as to be able to slidably receive the lower edge portion of the front panel 76. Near the rear end of the bottom extrusion 78 is an upwardly extending tongue 98 of a similar configuration to that of the upper tongue 90 which serves as a means for the bottom of the rear panel 94 to rest against. This bottom 100 of the panel 94 also has a downwardly extending lip or projection 102 so that it can rest over the free end of the bottom extrusion 78 and which is secured in place when engaged by a resilient catch 104 attached to the bottom of the extrusion 78. This catch 104 serves to release the rear panel 94 whenever desired by simply pressing downwardly on the free end thereof.

The rear panel 94, in this example, is clear and translucent, although it can be colored to obtain a variety of lighting effects if desired, and serves to illuminate the wall 12 or its covering 22 for the effect of attracting customer's attention to the building. Additionally, the panel 94 can be furnished with a prism structure 106 formed therein so as to provide a more even distribution or diffusion of light upon the building surface. Of course, this prism structure 106 is optional and need not be included if it is desired to reduce the cost of the rear panel 94. The front panel 76 can also be clear or transparent but is desirably either translucent white or colored. A particular color to blend in with the lighting or color scheme of the building can be selected. The front panel serves to light the area adjacent the building and to provide a decorative band effect around the outside of the building so as to also be attractive to the eye and call attention to the establishment to which it is installed.

Because the fluorescent lamps 58 are overlapping or staggered, normally the panel 76 would appear to be brighter at the top part thereof when the lamp 58 in front of that particular portion of the panel 76 is the upper lamp and brighter at the lower part thereof when the lamp 58 illuminating that particular portion of the panel 76 is the lower lamp. It has been found through experimentation that tongues 90 and 98, added for this purpose, serve as a diffusing mechanism and that when light rays emitted from the fluorescent lamps 58, and other light rays reflected by other inside surfaces of the band assembly 10, strike the tongues 90 and 98 they are reflected or re-reflected there off at numerous and various angles so as to give an overall effect eliminating the concentrated light areas either above or below the center of the front panel 76. Thus, a relatively important part of the present invention is the specific cooperation of the tongues 90 and 98 with the staggered relationship of the fluorescent lamps 58 so as to diffuse the light and thereby to prevent a concentration of light in any one particular area of the front panel 76.

Where each of the band assemblies 10 along adjacent walls 12 meet at a corner, they would be necessarily unstable if their structure remained the same as that throughout the rest of the band in that no supporting arm reaches the outer extremities of the corner. As a result the corner section 26, as shown in FIG. 1, must be constructed somewhat differently than the rest of the luminous band assembly 10. Furthermore, since the corner assembly, for the most part, does not need to have any rearwardly directed light to illuminate the building in that there is no buliding structure immediately opposite the rear directions of the corner section, there is no necessity for the rear of the band assembly to be light-transmitting and carry a rear panel such as 94 as employed in the rest of the band. Thus the rear of the band in the corner section 26 can be substantially solid and opaque.

The structure of the corner section 26 is clearly shown in more detail in FIGS. 7, 8, 9 and 10. FIG. 8 is an illustration of the left end of FIG. 7 showing that the housing 110 at the corner section 26 of the band is channel-shaped having upper and lower arm portions 112 and a bight portion 114. Both of the arms 112 of the housing 110 have inwardly directed portions 115 which form guide slots 116 to receive the front light-transmitting panel 76. The housing 110 forms two leg portions which are angularly disposed with respect to one another and which meet at the corner 131. Thus, it can readily be seen that the housing 110 formed in the corner sections is of a much more rigid structure than the housing structure 69 located throughout the rest of the lighting system and, as such, is more able to stabilize the free outer corner section 26.

However, the corner of the building would ordinarily have a shadow cast upon it by the support arms or arm assemblies 14' located adjacent the corners thereof due to the light cast by the rear panel 94 on the other side thereof. Because of this shadow the bight portion 114 of the housing 110 is apertured for a short distance closely adjacent the cornermost supporting arm assemblies 14' so as to allow light to escape therefrom onto the very corner edges of the building in order to eliminate the shadows cast thereon by the arm assemblies 14'. The apertures 124 are preferably covered by a plastic or other light-transmitting shield 94 which is inserted into slots 120 formed by angle brackets 122 on the housing 110 so as to give the effect of windows. Light emitted through the shield 94 covering apertures 124 thus serves to eliminate the shadows cast upon the corner of the building, as stated previously. The apertures 124 are formed in the bight portion 114 by cutting and bending in portions thereof which are shown as the flanges 126 in FIG. 9.

In the corner section 26, as seen in FIG. 10, the ends of the fluorescent lamps 58 are secured thereto by means of the staggered lampholders 74 mounted to channel-shaped lampholder supporting brackets or plates 128 secured directly to the bight portion 114 of the housing 110 by means of screws 130 or the like.

Adjacent the corner edge 131 of the corner section 126 a right angular support section 132 is provided which fits completely around the front portion of the band assembly 10 by means of inwardly extending flanges 33 overlapping the top and bottom of each of the legs 112 and is secured thereto by means of screws 134. It will be noted that the front plastic panel 76 extends only partially into this corner cover area so that expansion and contraction of the panel 76, due to changes in the ambient temperature and the operating temperature of the lamp, can be accommodated. The portion of the corner section 26 where the cover member 132 is employed is the only interruption or dark area that will be found in the present invention's front band portion. The apertures 136 and screws 80, see FIGS. 6 and 7, are employed as a means to bolt the corner section 26 to outwardly extending lips 82 of a connector 68. The lampholder supports 128 can be adjusted in varying positions along the bight portion 114 of the housing 10 to adjust to the particular length of the building wall 12 so as to accommodate standard sizes of fluorescent lamps 58.

It was stated previously that the front panel 76 along each side wall 12 is a single continuous piece of material. The panel 76, in this application, is a plastic strip which is pliable in character so that it can be wound upon a reel or spindle denoted generally by the reference numeral 138 in a conventional fashion, as shown in FIG. 11. The plastic panel 76 can thus be rolled off of the reel or spindle 138, be inserted into the band assembly 10, and be cut to the desired length so as to leave some room for expansion under the cover 132. This is the reason that the slots 86, 96 and 116 are made of a size so as to be able to slidably receive the front panel 76. Thus, the spool 138 can be set up at the end of a wall 12 and the panel 76 slid in the corresponding slots 86, 96 and 116 up into the corner section 26 and then cut off so as to be a continuous single piece of light-transmitting material. This eliminates the need for any dark areas and also prevents any light leaks that would be otherwise necessary if the front panel 76 were not a continuous piece but were separate individual end abutting pieces that had to be cemented together in some manner as was prevalent in the prior art.

Thus, the lighting system of the present invention is preferably assembled in the following manner:

The wall mounting brackets 16 are bolted directly to the building wall 12 according to a prearranged spacing plan. These are mounted prior to the installation of the porcelain enamel facing 22. After the porcelain facing 22 or other exterior finishing or facing material is installed, the support arm assemblies 14 and 14' are bolted to the wall mounting brackets 16 and 16' and the trim boxes 52 are mounted around the assemblies 14 and over the porcelain facing 22. The spaces 48 are then calked at 54. The top and bottom extrusions 77 and 78 are then mounted between the support arms and the clear extruded prismatic or rear cover 94 is snap-fitted into place. Then the support arms 14 and 14' are electrically wired together, preferably every other one, and the covers 40 are attached thereto. Then the corner assembly 26 is mounted to the adjacent housing sections 69. When all wiring and lamp installation is complete the front plastic panel 76 is slid into place through the slots 86, 96 and 116 up almost to the very corner edge 131 but leaving some room for expansion of the panel 76. One continuous length of plastic panel 76 is used for each building face. The corner cover 132 is then installed so as to cover over the expansion room beyond the end of the panel 76. Thus, it can readily be seen that this cover 132 cooperates with other parts of the corner section 26 to provide expansion and contraction room for the long front plastic cover 76.

It can be seen that the present invention involves a unique bidirectional band lighting system for a building by providing a continuous light-transmitting front band or ribbon along each building wall and a light-transmitting rear band for illuminating that wall, the rear band substantially eliminating any shadows on the building.

Since it is obvious that the invention can be embodied in other forms and constructions within the spirit and scope thereof, as would be apparent to one skilled in the art, it is to be understood that the particular form shown is but one of the many such embodiments. Accordingly, with various modifications and changes being possible, the invention is not limited in any way with respect thereto except by the terms of the included claims. Moreover, it is to be understood that certain features of the invention can be employed without a corresponding use of other features thereof.

Accordingly, what is claimed as new is:

1. A band lighting system comprising an elongated tubular housing providing a continuous illuminable passageway, support means for securing said housing to an upright structure and at a spaced distance in front thereof, the top and bottom wall portions of said housing being substantially opaque, at least one of the side wall portions of said housing being of a light-transmitting material substantially along the entire length thereof, pairs of lampholder supports mounted along the length of said housing, at least one pair of said lampholder supports being at a higher level within said housing than another adjacent pair of said lampholder supports and being staggered with respect thereto, an elongated lamp mounted on each pair of said lampholder supports so that the end of the elongated lamp mounted on said one pair will overlap the end of the elongated lamp mounted on said another pair, the overlapping ends of said elongated lamps eliminating any dark areas along said light-transmitting material when it is illuminated thereby, and light controlling means extending inwardly of said housing from each of said generally opaque side wall portions for diffusing the light emitted by said elongated lamps so as to eliminate concentrations of light upon a portion of the light-transmitting material immediately adjacent each of said elongated lamps.

2. A band lighting system for a structure having a number of upright walls comprising a plurality of cantilever supporting arms, means for spacedly securing said arms in a generally horizontal plane along at least an adjoining two of said walls, an elongated tubular housing secured to the free ends of said arms and extending along each of said walls, a corner section engaging each said housing forming substantially an extension of each said housing beyond the end of the walls to where they would otherwise intersect, the portion of each said housing and said corner section facing away from said walls being open, a continuous light-transmitting panel slidably engaged in each said housing and partially extending beyond said housing into the adjacent side of said corner section, a corner cover member attached to said corner section for covering the remaining open portion of said corner section, said remaining open portion providing room for expansion of said panel when necessary, and said panels providing a substantially uninterrupted light-transmitting band around said walls when lamp means are operated from within said housing.

3. A band light system for a structure having a number of upright walls comprising a plurality of cantilever supporting arms, means for spacedly securing said arms in a generally horizontal plane along at least an adjoining two of said walls, an elongated tubular housing secured to the free ends of said arms along each of said walls, a corner section engaging each said housing forming substantially an extension of each of said housing beyond the end of the walls to where they would otherwise intersect, the portion of each of said housing and said corner section facing away from said walls being of a substantially continuous light transmitting material, a portion of said housing facing toward said walls being generally of a light-transmitting material except where said housing is engaged by said arms, the portion of said corner section generally facing said walls being of a substantially more rigid material than said light-transmitting material so as to give additional support for said corner section, lamp means extending generally along the entire length of said housing and said corner section so as to emit light simultaneously through all of the light-transmitting portions thereof so that said walls and the area in front of said walls is illuminated, and aperture means formed in said rigid material of said corner section disposed to transmit light from said lamp means so that shadows cast upon said walls by the arms most closely adjacent the corner section are substantially eliminated.

4. A band lighting system for a structure having a number of upright walls, said system comprising a plurality of cantilever supporting arms, means for spacedly securing said arms along at least an adjoining two of said walls, an elongated tubular housing secured to the free ends of said arms and extending generally along each of said walls, a tubular corner section attached to the adjacent ends of each said housing, the portion of each said housing and said corner section facing away from said walls being open, a substantially continuous light-transmitting panel engaged in said open portion, pairs of lampholder supports mounted within said housing, means for locating said lampholder supports with respect to one another so that at least two of said pairs are so disposed as to support elongated lamps in an overlapping relationship to one another, at least one lampholder support in each side of said corner section being adjustable so that standard lamps can be employed therein even if they do not entirely cover the full length of each said housing and said corner section, said housing and said corner section presenting a substantially uninterrupted continuous illuminating band around said walls when operating light sources are placed therein.

5. A corner structure for a bidirectional band lighting system adjacent at least two sides of a wall structure, said corner structure comprising a substantially channel-shaped housing presenting an open side and having upper and lower arm portions and a bight portion, said housing forming a pair of angularly disposed leg portions, a first slot means located on the free ends of said arm portions, a second slot means located on said bight portion, apertures formed in said bight portion, a light transmitting panel engaged in said first slot means to substantially cover the open side of said housing, a light-transmitting shield engaged in said second slot means sufficient to cover said apertures, and lampholding means secured to the inside of said housing so that light emitted from lamps held by said lampholding means will simultaneously illuminate said panel to give a band effect and will pass through said apertures and said shield to eliminate shadows cast on said wall structure by said system.

6. A corner structure for a band lighting system adjacent at least two sides of a wall structure, said corner structure comprising a substantially channel-shaped housing presenting an open side and having upper and lower arm portions and a bight portion, said housing forming a pair of leg portions angularly disposed to one another so as to meet at a corner edge, a guide slot means located on the free ends of said arm portions, said slot means being disposed so as to receive a continuous light-transmitting panel therein, said panel being located in said slot means short of said corner edge to allow room for expansion and contraction of said panel, a corner cover means secured to said housing for covering the portion of said open side not containing said panel in its most contracted condition, lamp support means mounted within said housing, said corner structure including means for attachment of its housing to the rest of the lighting system along adjacent sides of said wall structure so as to present a substantially continuous band.

7. The combination of a band lighting system and a structure having a number of upright walls, said system comprising a plurality of supporting arm assemblies, mounting means for securing said arm assemblies to said upright walls, electrical components located in alternate ones of said arm assemblies, a connector means, a band housing secured to said arm assemblies by said connector means, said housing having illuminating means for bidirectional lighting of said upright walls and the area adjacent said upright walls, said illuminating means including a continuous light-transmitting panel means slidably engaged along one face of said housing and including overlapping elongated lamp means for eliminating dark areas along said panel means, light-control means located in said housing for diffusing light emitted from said lamp means, and a corner section for joining the housing along one of said upright walls to the housing along an adjacent one of said upright walls, said corner section including means for containing extensions of said panel means and providing room for expansion and contraction thereof, said corner section including means for eliminating shadows cast upon said upright walls by said arm assemblies, said housing and corner section presenting a bidirectional band lighting system having a substantially continuous uninterrupted front band for illuminating the area in front of said upright walls while still simultaneously providing for illumination of said upright walls.

8. The combination of a band lighting system and a structure having a number of upright walls, said system comprising a plurality of tubular cantilever supporting arms, a mounting bracket securing each of said arms to at least an adjoining two of said walls at spaced distances therealong and in a generally horizontal plane, a facing secured to and covering said structure except where said mounting brackets are secured thereto, outwardly extending means on each said bracket fitting in an open end of each said arm to support it from said structure, trim means fitted around each said arm adjacent said facing for closing an opening formed therebetween, electrical components located in at least one of said arms, a tubular band housing having its rear portion generally facing said upright walls, a generally C-shaped connector member secured to the free open ends of each of said arms, each said connector member having an opening in the bight portion thereof which is in registration with the free open end of one of said arms, means for securing opposite ends of said band housing between adjacent connector members so that a continuous wireway between said arms and said housing is formed, the bottom of each of said arms including a generally removable cover member so as to provide ready access to at least some of said electrical components, the top and bottom wall portions of said band housing being generally opaque, downwardly and upward disposed first slot means formed at the outer front edges of said top and bottom wall portions respectively, downwardly and upwardly disposed securing means formed at the outer rear edges of said top and bottom wall portions respectively, a corner section engaging the band housing along at least an adjoining two of said upright walls forming substantially an extension of each said band housing beyond the end of the upright walls to where they would otherwise intersect, said corner section comprising a substantially channel-shaped rigid housing having upper and lower extrusions and a bight portion, apertures formed in said bight portion, said rigid housing forming a pair of angularly disposed leg portions meeting at a corner edge for alignment with each said band housing, one of said connector members securing each said leg portion to one of said band housings, downwardly and upwardly disposed second slot means located on the front free ends of said upper and lower extrusions respectively, downwardly and upwardly disposed third slot means located on said bight portion above and below said apertures respectively, said second slot means being in line with said first slot means, a single piece light-transmitting panel engaged in said first and second slot means in the front of said band housing and said corner section along each adjacent wall, said panel being located in said second slot means short of said corner edge to allow room for expansion and contraction of said panel, a corner cover means secured to said rigid housing for covering the open front portion of said rigid housing not containing said panel in its most contracted condition, pairs of lampholder supports secured to the bight portions of said connector members, adjustable lampholder supports secured to the rigid housing of said corner section for mating with a lampholder support on the connector members adjacent said corner section, alternate lampholder supports of each said pair thereof being located at a different level than the other lampholder support of each said pair and being disposed in an overlapping array so that one lampholder support of a pair mates with one lampholder support of an adjacent pair, an elongated lamp mounted on and between each of said mating lampholder supports so that at least one end of each elongated lamp overlaps the end of its adjacent elongated lamp, the overlapping ends of said elongated lamps and said single-piece panel substantially eliminating any dark areas in the front band portion of the system along each of said upright walls when said elongated lamps are operating, light controlling tongue means extending inwardly of the top and bottom wall portions of said band housing for diffusing the light emitted by said elongated lamps so as to eliminate concentrations of light upon a portion of the panel immediately adjacent each of said elongated lamps, a rear light-transmitting prismatic enclosure engaged by said securing means of the top and bottom walls of said band housing, said rear enclosure permitting light from said elongated lamps to illuminate said upright walls while simultaneously illuminating the area adjacent said upright walls through said panel, light-transmitting shield means engaged in said third slot means sufficient to cover the apertures in the rigid housing of said corner section so that light emitted from said elongated lamps passes through said apertures and said shield means to eliminate shadows cast on said upright walls by said band lighting system.

References Cited in the file of this patent

UNITED STATES PATENTS

| | | |
|---|---|---|
| 2,118,749 | Weaver | May 24, 1938 |
| 2,298,824 | Darley | Oct. 13, 1942 |
| 2,662,163 | Mollner | Dec. 8, 1953 |
| 2,691,720 | Simmons | Oct. 12, 1954 |
| 2,708,711 | McGinty et al. | May 17, 1955 |
| 2,802,097 | Franck | Aug. 6, 1957 |
| 2,845,855 | Burns | Aug. 5, 1958 |
| 2,875,323 | Harling | Feb. 24, 1959 |
| 2,897,348 | Akely et al. | July 28, 1959 |
| 2,970,222 | Husby et al. | Jan. 31, 1961 |

FOREIGN PATENTS

| | | |
|---|---|---|
| 545,358 | Great Britain | May 21, 1942 |
| 756,089 | Great Britain | Aug. 29, 1956 |